United States Patent
Hsieh et al.

(10) Patent No.: US 7,630,622 B2
(45) Date of Patent: Dec. 8, 2009

(54) AUTOMATIC FOCUSING METHODS AND IMAGE CAPTURE DEVICES UTILIZING THE SAME

(75) Inventors: Wen-Hung Hsieh, Taichung (TW); Ching-Jung Tsai, Taichung (TW); Yu-Ting Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 414 days.

(21) Appl. No.: 11/609,611

(22) Filed: Dec. 12, 2006

(65) Prior Publication Data

US 2007/0140677 A1     Jun. 21, 2007

(30) Foreign Application Priority Data

Dec. 19, 2005   (TW) ............................... 94145041 A

(51) Int. Cl.
*G03B 13/36*     (2006.01)

(52) U.S. Cl. ..................... 396/127; 396/118; 348/353

(58) Field of Classification Search ............... 348/356; 396/118, 127
See application file for complete search history.

(56) References Cited

U.S. PATENT DOCUMENTS

| | | | | |
|---|---|---|---|---|
| 4,967,280 | A  * | 10/1990 | Takuma et al. | 348/355 |
| 5,969,760 | A  * | 10/1999 | Ernest et al. | 348/357 |
| 6,614,480 | B1 * | 9/2003 | Oda et al. | 348/351 |
| 2004/0227843 | A1* | 11/2004 | Watanabe | 348/354 |
| 2006/0078323 | A1* | 4/2006 | Nakahara | 396/127 |

* cited by examiner

*Primary Examiner*—W. B. Perkey
*Assistant Examiner*—Leon W. Rhodes
(74) *Attorney, Agent, or Firm*—Thomas, Kayden, Horstemeyer & Risley

(57) ABSTRACT

An autofocusing method is implemented in an image capture device comprising a lens and a sensor module. The relative positions of lens and the sensor module are adjusted for autofocusing based on a factor. First, the relative positions of the lens and the sensor module are adjusted based on a first unit of the factor to determine a plurality of states of the lens and the sensor module, where the lens renders clearer images on the sensor module. The states are utilized to estimate a best state achievable by focusing based on a second unit of the factor, where the lens renders a clearest image on the sensor module. The second unit is finer than the first unit. The lens or the sensor module is driven to the best state.

2 Claims, 5 Drawing Sheets

AUTOMATIC FOCUSING METHODS AND IMAGE CAPTURE DEVICES UTILIZING THE SAME

BACKGROUND OF THE INVENTION

1. Field of the Invention

The present invention relates to optic techniques, and more particularly to automatic focusing.

2. Description of the Related Art

Autofocusing in a camera is accomplished by focus adjustment according to measured distances between the subjects and the camera utilizing a range finder. Passive autofocusing utilized in digital cameras eliminates range finders. Digitized images are captured through the lens, and clarity values thereof are obtained by frequency domain transformation and treated as the basis for focus adjustment in which an image with maximum clarity is found.

A lens, referred to as focusing lens, in a conventional camera is driven by a motor to 15-20 positions for focus adjustment. For example, assume that a focusing lens of a camera is movable to N positions. In FIG. 1, coordinates of every point on the horizontal axis represent positions of the focusing lens, and coordinates on the vertical axis are clarity values. After clarity values corresponding to each position of the focusing lens have been obtained, the focusing lens is adjusted to a position $P_F$ corresponding to the maximum clarity value $M_{max}$.

Current focusing lenses can be driven from 20 to 200 positions. Executing frequency domain transformation for each position, however, is very time consuming. Focus adjustment, therefore, is divided into two stages. First, clarity values corresponding to a portion of N positions are computed. For example, as shown in FIG. 2, results of frequency domain transformation corresponding to seven positions are derived, wherein M corresponding to position P is the current relative maximum value. As shown in FIG. 3, in the second stage, clarity values corresponding to positions around position P are calculated in detail to locate the absolute maximum value $M_{max}$ corresponding to position $P_F$.

Two stage autofocusing, however, is still time consuming in practice.

BRIEF SUMMARY OF THE INVENTION

An exemplary embodiment of an automatic focusing method is implemented in an image capture device comprising a lens and a sensor module. The relative positions of lens and the sensor module are adjustable for automatic focusing based on a factor. The relative positions of the lens and the sensor module are adjusted based on a first unit of the factor to determine a plurality of states of the lens and the sensor module, where the lens renders clearer images on the sensor module. The determined states are utilized to estimate a best state achievable by focus adjustment based on a second unit of the factor, where the lens renders a clearest image on the sensor module, wherein the second unit is finer than the first unit. The lens and the sensor module are driven to the best state.

An exemplary embodiment of an image capture device comprises a sensor module, a lens, and a processor. The sensor module converts light beams into electric signals. The lens renders images on the sensor module. The processor focuses the lens by adjusting a factor based on a first unit of the factor to determine a plurality of states of the lens, where the lens renders clearer images on the sensor module. The processor utilizes the determined states to estimate a best state achievable by focus adjustment based on a second unit of the factor, where the lens renders a clearest image on the sensor module. The second unit is finer than the first unit. The lens is driven to the best state.

An exemplary embodiment of an image capture device comprises a sensor module converting light beams into electric signals, a lens rendering images on the sensor module, and a processor. The processor adjusts the position of the sensor module based on a first unit of a factor to determine a plurality of states of the sensor module, where the lens renders clearer images on the sensor module. The processor utilizes the determined states to estimate a best state achievable by position adjustment of the sensor module based on a second unit of the factor, where the lens renders a clearest image on the sensor module. The second unit is finer than the first unit. The processor drives the sensor module to the best state.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
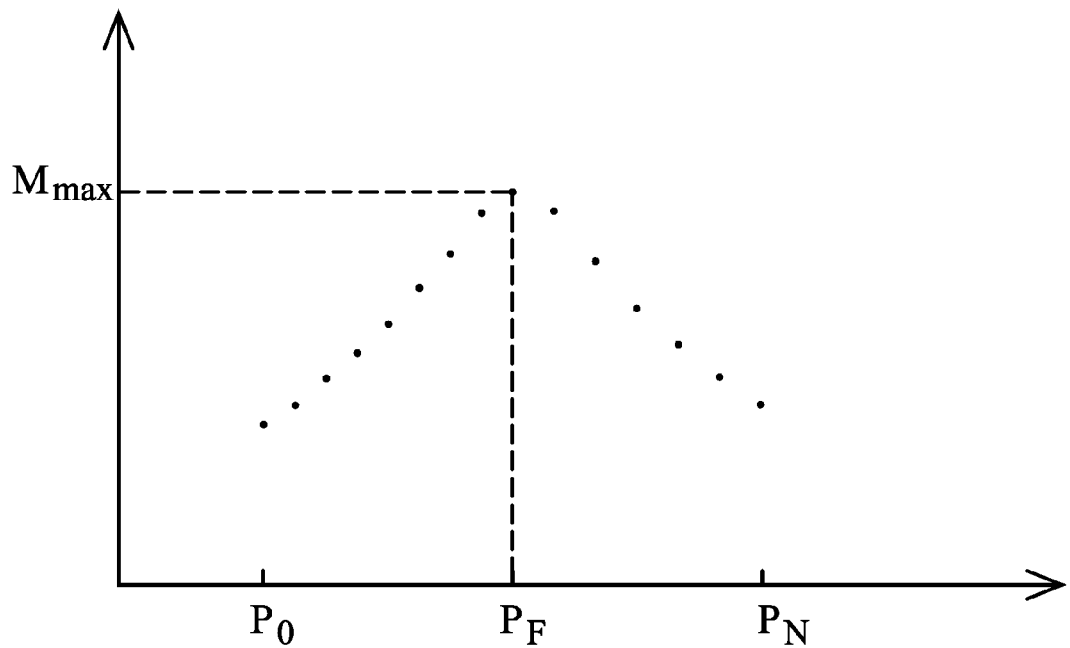
FIG. 1 is a schematic diagram showing the relationships between clarity values and positions of a focusing lens or a sensor module.
Figure 2:
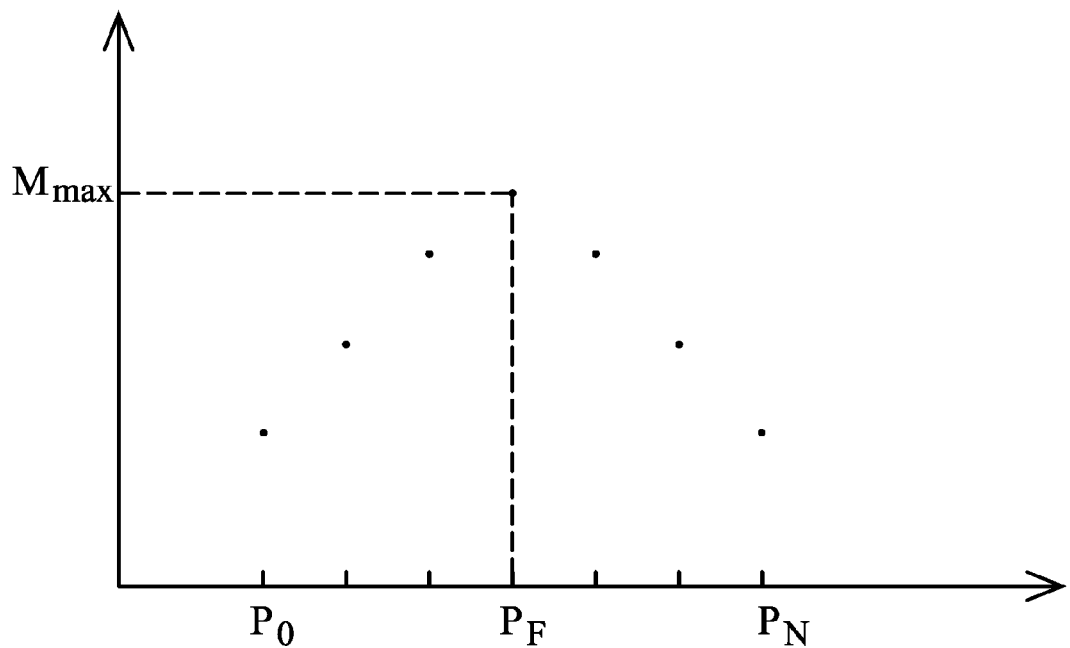
FIG. 2 is a schematic diagram showing the relationships between clarity values and positions of a focusing lens or a sensor module.
Figure 3:
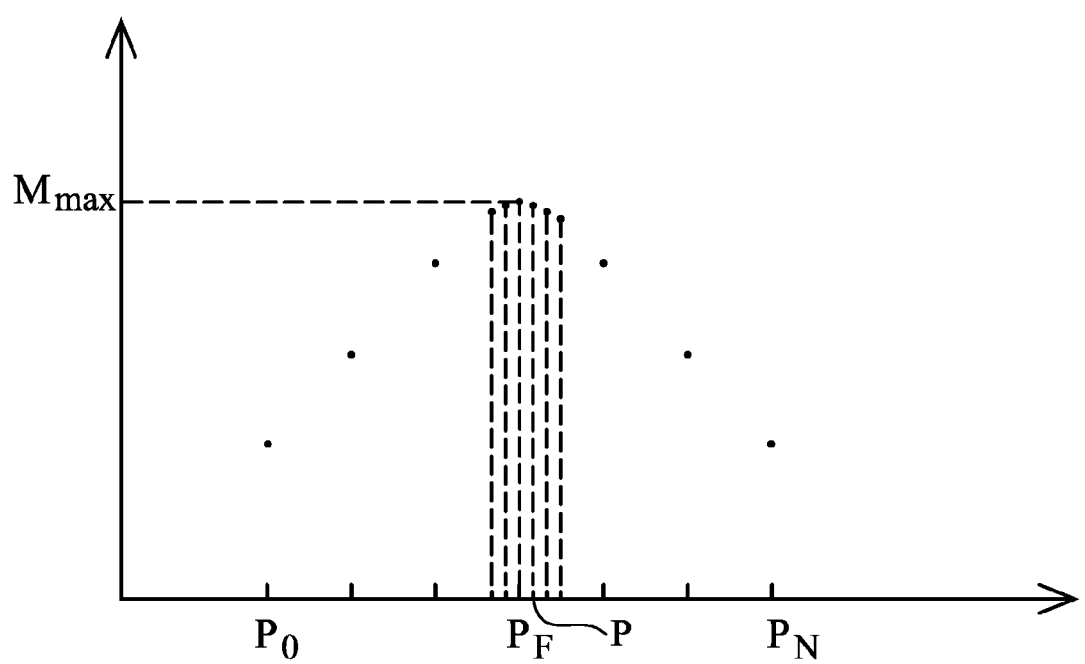
FIG. 3 is a schematic diagram showing the relationships between clarity values and positions of a focusing lens or a sensor module.
Figure 4:
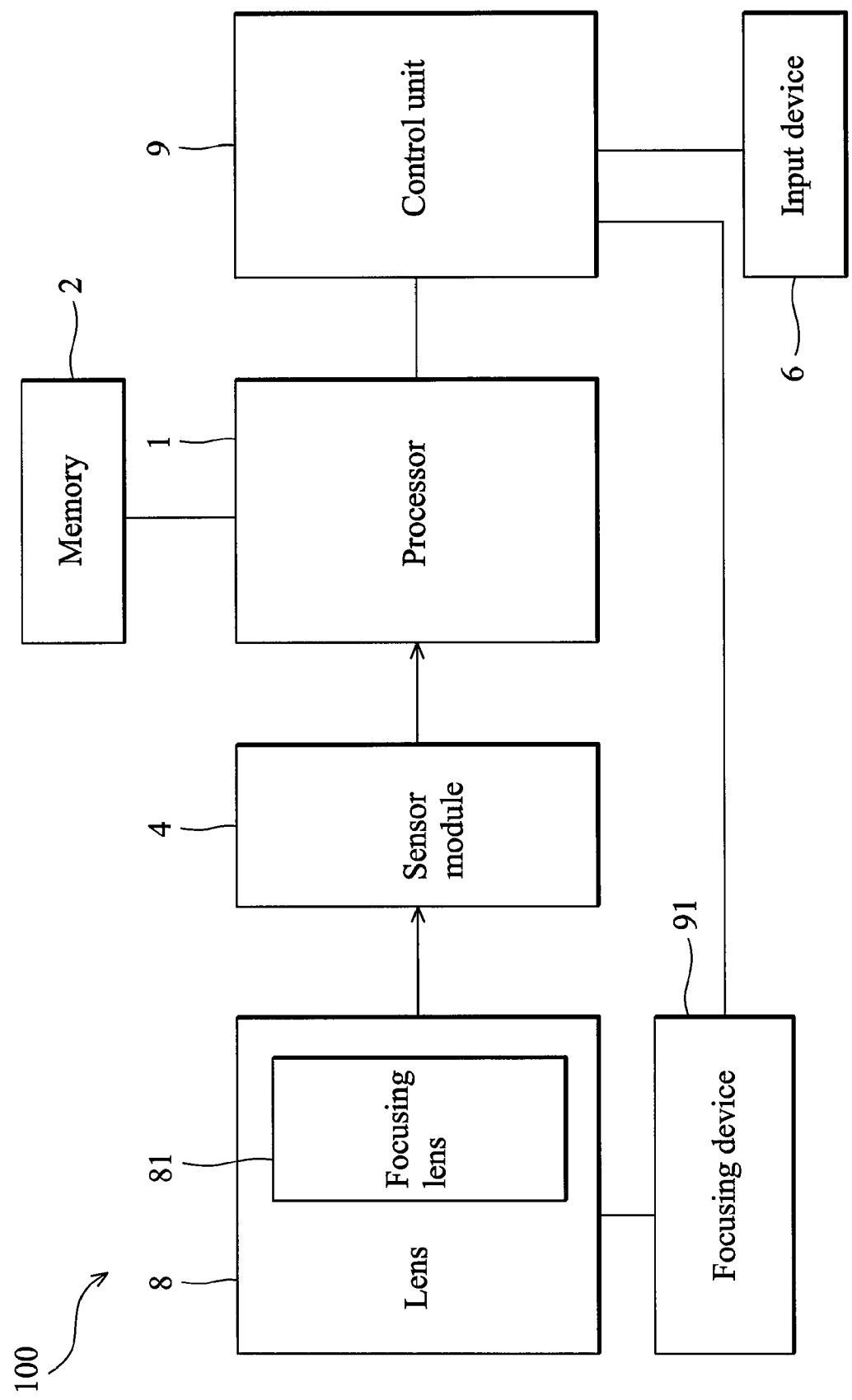
FIG. 4 is a block diagram of an exemplary embodiment of an image capture device.

In image capture device 100 shown in FIG. 4, processor 1 is coupled to memory 2, sensor module 4, input device 6 and control unit 9. Processor 1 comprises a digital signal processor (DSP). Control unit 9 may be integrated into processor 1.

Sensor module 4 may be a complementary metal-oxide semiconductor (CMOS) or a charge-coupled device (CCD). Sensor module 4 receives light beams from lens 8 and accordingly generates electric signals to form image data.

Control unit 9 is coupled to focusing device 91 and drives focusing device 91 based on information of images provided by processor 1 to perform automatic focus adjustment for lens 8. Control unit 9 begins automatic focusing in response to the status of input device 6. Shutter release device 6 may comprise a release button on image capture device 100 or an external device.

Light beams through lens 8 render an image on sensor module 4. Lens 8 may be implemented by various types of lenses and adjusted for focusing based on different factors. For example, lens 8 may comprise groups of lenses, and focusing device 91 may comprise mechanical components for moving the focusing lens therein.

Figure 5:
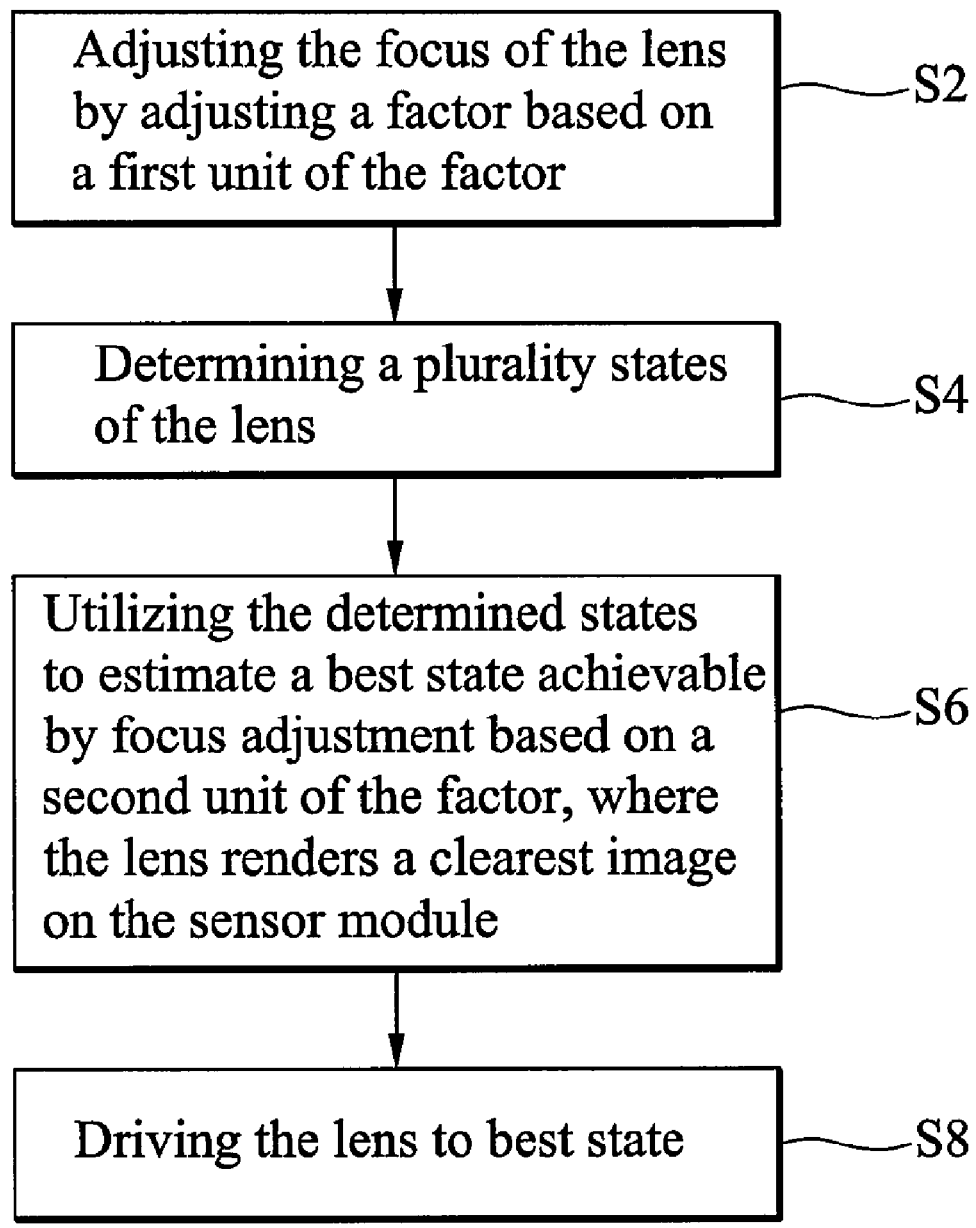
FIG. 5 is a flowchart of an exemplary embodiment of an automatic focusing method.

With reference to FIG. 5, image capture device 100 performs an automatic focusing method. It is provided that the focus of lens 8 can be adjusted via a factor.

Processor 1 adjusts the focus of lens 8 by adjusting the factor based on a first unit thereof (step S2) to determine a plurality of states of lens 8, where lens 8 renders clearer images on sensor module 4 (step S4). For example, processor 1 may determine a relative best state of lens 8, where lens 8 renders a clearer image on sensor module 4, and locate two states adjacent to the relatively best state. Thus, a total of three states are obtained.

Processor 1 estimates a best state achievable by focusing lens 8 based on a second unit of the factor utilizing the determined states, where lens 8 renders a clearest image on sensor module 4 (step S8). The second unit is finer than the first unit.

Figure 6:
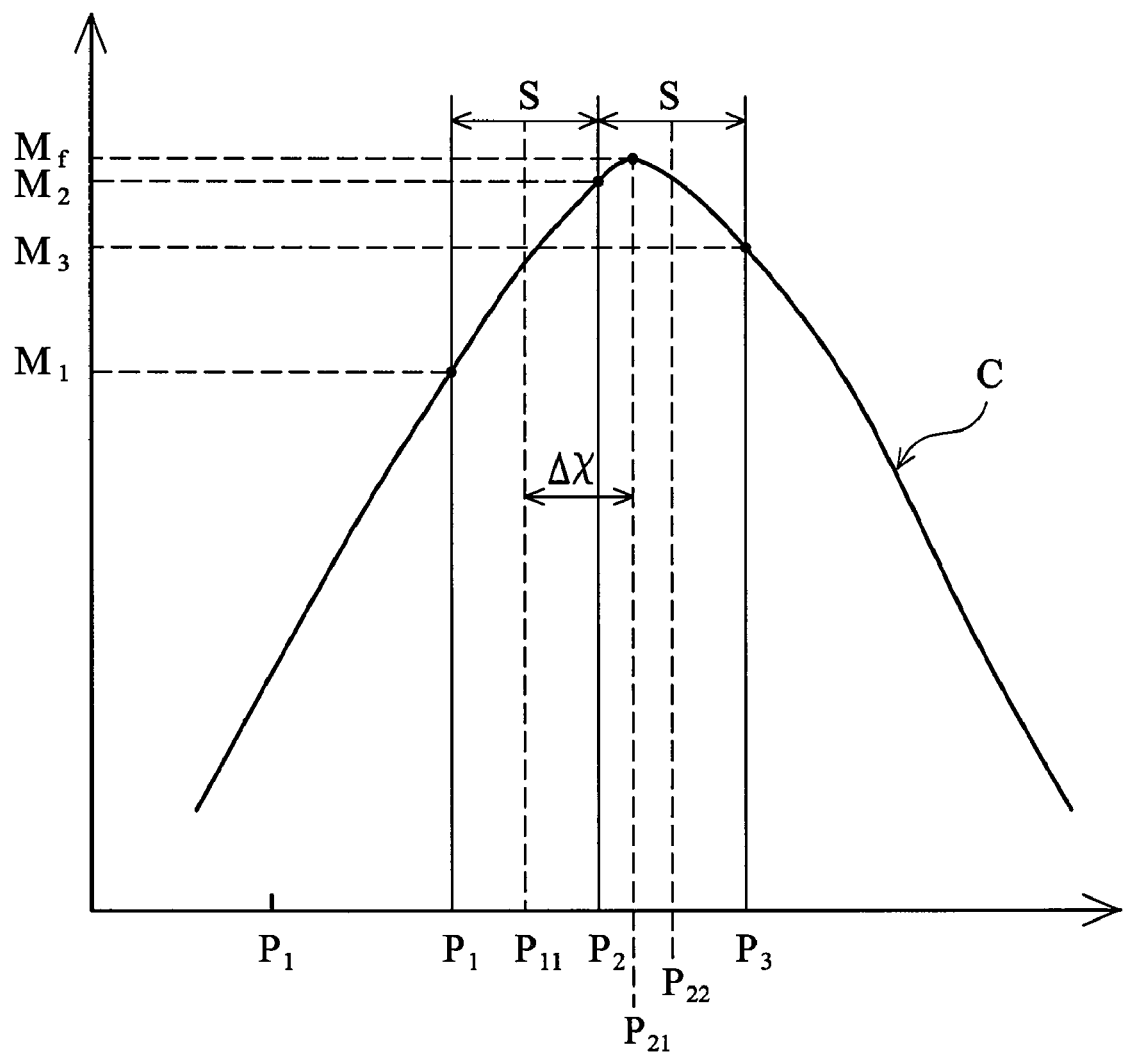
FIG. 6 is a schematic diagram showing the relationships between clarity values and positions of a focusing lens in the embodiment.

For example, lens 8 comprises groups of lenses, and the factor is the position of a focusing group, referred to as focusing lens 81. With reference to FIG. 6, the horizontal axis represents positions of focusing lens 81, and the vertical axis represents clarity values of images rendered by lens 8 on sensor module 4. Focusing lens 81 is movable between positions $P_0$ and $P_N$. For example, the second unit is the smallest interval for each movement of focusing lens 81, referred to as the smallest pace. If the distance between positions $P_0$ and $P_N$ comprises 144 instances of the smallest pace, the first unit may be $|\sqrt{144}|$ instances of the smallest pace, i.e. 12 smallest paces.

In step S2, control unit 9 moves focusing lens 81 from position $P_0$ to position $P_N$ with each pace of the 12 smallest paces (the first unit) and thus adjust the focus of lens 8.

In the focus adjustment, each time when focusing lens 81 is moved to a position, sensor module 4 captures an image from lens 8. Thus, a position corresponds to an image. The process is repeated until focusing lens 81 reaches position $P_N$, the maximum of the ranked positions. Thus, a plurality of images are captured, each corresponding to a value of the factor (i.e. the positions). The corresponding values comprise an arithmetic progression where the common difference S thereof is the first unit larger than the smallest pace.

Processor 1 evaluates the clarity of each captured image. Control unit 9 determines three positions $P_1$, $P_2$, and $P_3$ of focusing lens 81 where lens 8 renders clearer images on sensor module 4. Position $P_2$ is the current relative best position providing the best image clarity. Position $P_1$ is before position $P_2$, and position $P_3$ is after position $P_2$. Control unit 9 estimates a best position of focusing lens 81 utilizing these three positions and a formula which may be derived as described in the following.

The curve in FIG. 6 is an assumed autofocusing curve, wherein position $P_{21}$ is assumed as the best position corresponding to a maximum clarity value $M_f$. Position $P_{11}$ is the midpoint of $P_1$ and $P_2$. Position $P_{22}$ is the midpoint of $P_2$ and $P_3$. The distance between $P_{11}$ and $P_{22}$ is S. Let the distance between $P_{11}$ and $P_{21}$ be $\Delta x$, and the distance between $P_{21}$ and $P_{22}$ be $S-\Delta x$ The ratio of distance between $P_{11}$ and $P_{22}$ to the distance between $P_{11}$ and $P_{21}$ is $\Delta x/(S-\Delta x)$, which is assumed to be equal to $(M_2-M_3)/(M_2-M_1)$, the ratio of the difference between $M_2$ and $M_1$ to the difference between $M_2$ and $M_3$.

When $$\frac{\Delta x}{S - \Delta x} = \frac{M_2 - M_3}{M_2 - M_1}, \text{ then} \tag{1}$$

$$\Delta x = \frac{M_2 - M_3}{(M_2 - M_1) + (M_2 - M_3)} \times S$$

It is known that $$P_{21} = P_2 - \frac{1}{2}S + \Delta x \text{ and}$$
$$S = (P_2 - P_1),$$

so $$P_{21} = P_2 - \frac{1}{2}(P_2 - P_1) + \Delta x \tag{2}$$
$$= P_2 - \frac{1}{2}(P_2 - P_1) + \frac{M_2 - M_3}{(M_2 - M_1) + (M_2 - M_3)} \times (P_2 - P_1)$$

When clarity values $M_1$, $M_2$, and $M_3$ are obtained, position $P_{21}$ can be determined utilizing formula (2). Focusing lens 81 is driven to the best position $P_{21}$.

In the method, focusing lens 81 travels from position $P_0$ to $P_N$ based on the first unit for once. Processor 1 calculates position $P_{21}$ utilizing positions $P_1$, $P_2$, and $P_3$ by interpolation. Processor 1 performs adding, subtraction, multiplication, and division for the estimation, and thus improves computation time.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic focusing method, implemented in an image capture device comprising a lens and a sensor module, wherein the relative positions of lens and the sensor module are adjustable for automatic focusing based on a factor regarding the relative positions of components of the image capture device, comprising:

adjusting the relative positions of the lens and the sensor module based on a first unit of the factor to determine a plurality of states of the lens and the sensor module, where the lens renders clearer images on the sensor module, and wherein the adjusting step comprises:

increasing the factor by one first unit for each adjustment of the relative positions of the lens and the sensor module from a minimum to a maximum of the factor;

each time when the factor is increased to a value, capturing an image through the lens, thus, to capture a plurality of images corresponding to different values of the factor; and evaluating clarity of the captured images;

utilizing the determined states to estimate a best state achievable by focus adjustment based on a second unit of the factor, comprising:

retrieving three values of the factor corresponding to the determined states; and estimating a value of the factor corresponding to the best state utilizing the retrieved values;

where the lens renders a clearest image on the sensor module, wherein the second unit is finer than the first unit, wherein the determined states comprise three states where the lens renders clearer images on the sensor module, the lens comprises groups of lenses, and the factor is the position of a focusing group, the three states comprise a first position $P_2$ of the focusing group where the lens renders, on the sensor module, an image the clarity of which is optimized by position adjustment of the focusing group based on the first unit, and said three states further comprise a former position $P_1$ and a latter position $P_3$ adjacent to the first position $P_2$, when the former position $P_1$, the first position $P_2$, and the latter position $P_3$ respectively correspond to clarity values $M_1$, $M_2$, and $M_3$, a position $P_{21}$ of the focusing group corresponding to the best state is estimated by the following formula:

$$P_{21} = P_2 - \frac{1}{2}(P_2 - P_1) + \frac{M_2 - M_3}{(M_2 - M_1) + (M_2 - M_3)} \times (P_2 - P_1),$$

and the clarity value $M_2$ exceeds the clarity values $M_1$ and $M_3$; and driving the lens and the sensor module to the best state.

2. An automatic focusing method, implemented in an image capture device comprising a lens and a sensor module, wherein the relative positions of lens and the sensor module are adjustable for automatic focusing based on a factor regarding the relative positions of components of the image capture device, comprising:

adjusting the relative positions of the lens and the sensor module based on a first unit of the factor to determine a plurality of states of the lens and the sensor module, where the lens renders clearer images on the sensor module, and wherein the adjusting step comprises:

increasing the factor by one first unit for each adjustment of the relative positions of the lens and the sensor module from a minimum to a maximum of the factor;

each time when the factor is increased to a value, capturing an image through the lens, thus, to capture a plurality of images corresponding to different values of the factor; and evaluating clarity of the captured images;

utilizing the determined states to estimate a best state achievable by focus adjustment based on a second unit of the factor, comprising:

retrieving three values of the factor corresponding to the determined states; and estimating a value of the factor corresponding to the best state utilizing the retrieved values;

where the lens renders a clearest image on the sensor module, wherein the second unit is finer than the first unit, wherein the determined states comprise three states where the lens renders clearer images on the sensor module, the sensor module comprises complementary metal-oxide semiconductor (CMOS) or charge-coupled device (CCD), and the factor is the position of the sensor module the three states comprise a first position $P_2$ of the sensor module where the lens renders, on the sensor module, an image the clarity of which is optimized by position adjustment of the sensor module based on the first unit, and said three states further comprise a former position $P_1$ and a latter position $P_3$ adjacent to the first position $P_2$, when the former position $P_1$, and the first position $P_2$, and the latter position $P_3$ respectively correspond to clarity values $M_1$, $M_2$, and $M_3$, a position $P_{21}$ of the sensor module corresponding to the best state is estimated by the following formula:

$$P_{21} = P_2 - \frac{1}{2}(P_2 - P_1) + \frac{M_2 - M_3}{(M_2 - M_1) + (M_2 - M_3)} \times (P_2 - P_1),$$

and the clarity value $M_2$ exceeds the clarity values $M_1$ and $M_3$; and driving the lens and the sensor module to the best state.

* * * * *